May 4, 1943. J. C. CROWLEY 2,318,378
STEM CONNECTION FOR CURING MOLDS
Filed March 17, 1942 2 Sheets-Sheet 1
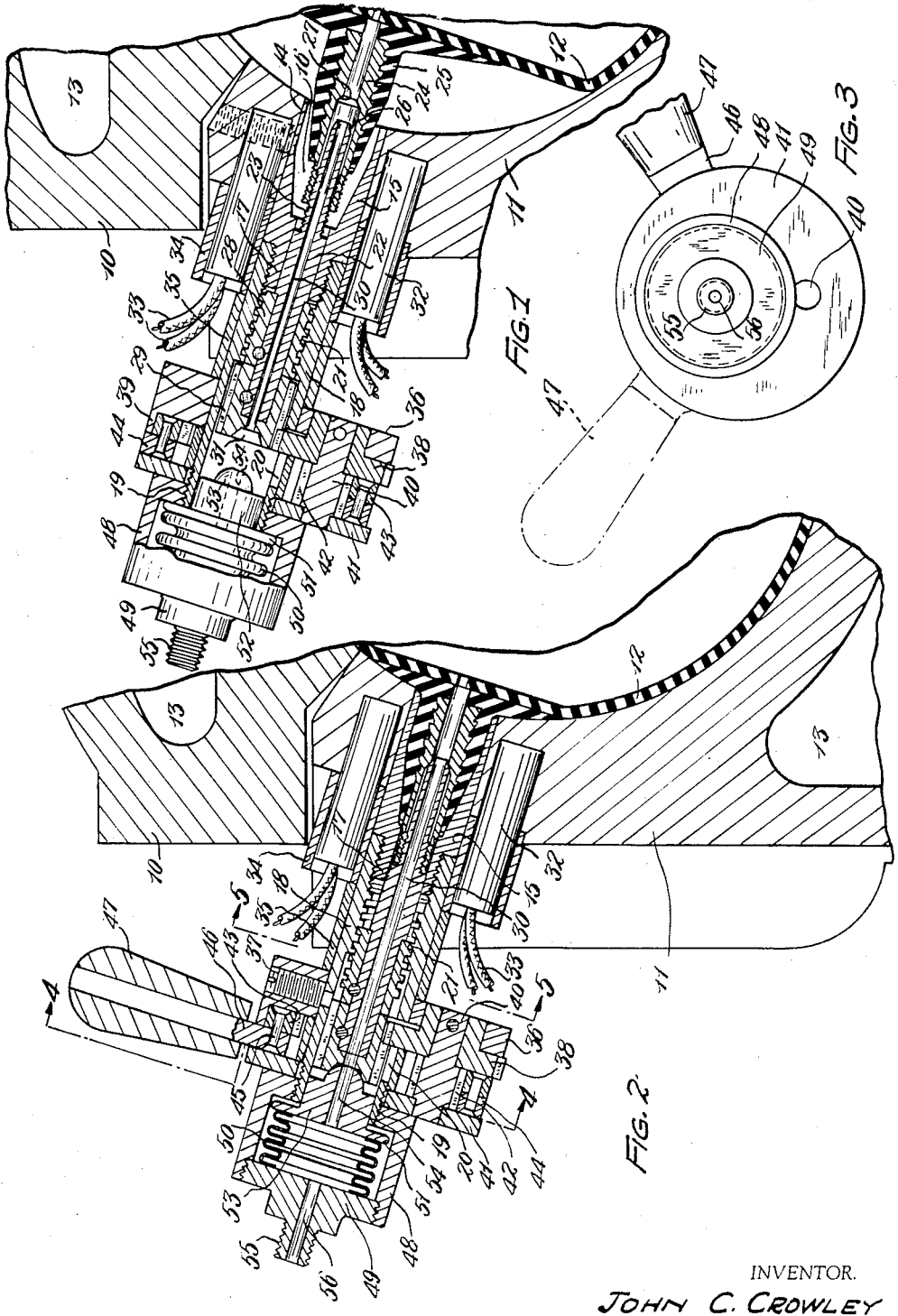
INVENTOR.
JOHN C. CROWLEY
BY
Kwis Hudson & Kent
ATTORNEYS May 4, 1943. J. C. CROWLEY 2,318,378
STEM CONNECTION FOR CURING MOLDS
Filed March 17, 1942 2 Sheets-Sheet 2
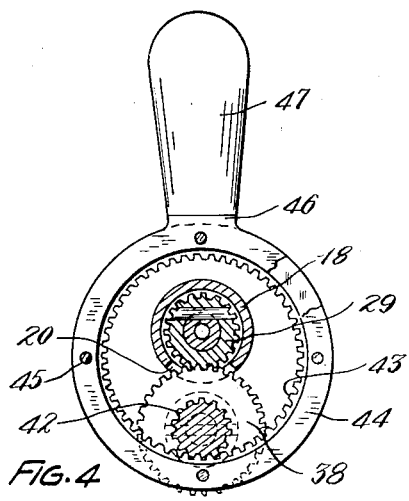
INVENTOR.
JOHN C. CROWLEY
BY Kwis Hudson & Kent
ATTORNEYS Patented May 4, 1943

2,318,378

UNITED STATES PATENT OFFICE 2,318,378

STEM CONNECTION FOR CURING MOLDS

John C. Crowley, Cleveland Heights, Ohio, assignor to The Dill Manufacturing Company, Cleveland, Ohio, a corporation of Ohio Application March 17, 1942, Serial No. 435,018

9 Claims. (Cl. 18—38)

This invention relates to a mold for curing inflatable rubber articles such as pneumatic tire tubes or other similar articles.

More particularly the invention relates to the provision in a mold of the character specified of means for connecting the valve stem of the inflatable rubber article to be cured to a source of pressure fluid and for properly positioning said valve stem in the stem opening of the mold. In addition the invention relates, if the valve stem is a partially formed and/or an incompletely cured rubber valve stem, to the provision in the mold of improved means for imparting to said stem its final shape and/or for effecting the proper and complete curing of the stem during the curing of the inflatable rubber article.

A device embodying the present invention may be used to special advantage in a mold for curing tire tubes or other inflatable rubber articles and which articles are equipped with rubber valve stems. These rubber valve stems may be completely molded and/or completely cured before they are applied to the articles and placed with the latter in the curing mold or they may be partially formed and/or not completely cured prior to their application to the articles. In the latter instance the curing of the rubber valve stems is carried out or completed during the curing of the articles.

On the other hand, the rubber valve stems when initially applied to the articles and placed with the latter in the curing mold may consist of pieces or chunks of uncured or raw rubber stock only preformed into approximate valve stem shape to an extent sufficient to enable the pieces or chunks of raw rubber stock to enter the stem opening and cavity of the mold and be cured completely and molded thereby into final valve stem shape simultaneously with the curing of the articles; the valve stems and articles when cured becoming integrated units.

The method of manufacturing rubber valve stems and tire tubes as integrated units in the manner just referred to is disclosed in Bronson Patent No. 2,230,879, issued February 4, 1941, and devices embodying the present invention can be used advantageously with a curing mold to facilitate carrying out the method disclosed in said patent.

An object of the invention is to provide in combination with a curing mold for curing inner tubes and other inflatable rubber articles, improved and novel means associated with the stem opening of the mold and including instrumentalities for connecting the valve stems of the articles being cured to a source of pressure fluid and for facilitating the complete and proper positioning of the valve stems in the said stem opening of the mold.

Another object is to provide a device for accomplishing the above specified object and which device can be applied to a curing mold substantially without alteration of the mold and without disturbing or removing any of the surfaces of the mold members which constitute the mold cavity.

Another object is to provide in a curing mold for curing tire tubes and other inflatable rubber articles which are equipped with rubber valve stems, improved and novel means for connecting the rubber valve stems to a source of pressure fluid or for imparting the required and desired final shape to the rubber valve stems or for properly and completely curing said rubber valve stems simultaneously with the curing of the tire tubes or other inflatable articles.

A further object is to provide in a mold for simultaneously molding and curing as integrated units uncured tire tubes or other inflatable rubber articles and raw or uncured rubber valve stems therefor, improved and novel means for connecting the valve stems to a source of pressure fluid and for molding the stems into final valve stem shape and for properly curing the uncured stems and uncured articles simultaneously to the desired amount.

A further object is to provide improved and novel means such as above specified and which is efficient in operation and is relatively simple in construction and facilitates the positioning of the articles to be cured in the curing mold as well as the connecting of the valve stems to a source of pressure fluid.

A still further object is to provide in a curing mold for inner tubes or other inflatable articles, means associated with the valve stem opening of the mold for applying heat adjacent to said opening independently of the usual heating source for the mold and which means includes instrumentalities for locating the valve stem in the opening and for connecting the same to a source of fluid under pressure, whereby pressure and heat are applied in close proximity to the valve stem to assist in the final shaping and curing thereof and the vulcanization of the rubber of the stem to the metal insert.

Further and additional objects and advantages not hereinbefore specified will become apparent hereinafter during the detailed description which is to follow of embodiments of the invention that are illustrated in the accompanying drawings wherein, Fig. 1 is a fragmentary sectional view through a curing mold and through a device embodying the invention and which has been applied to said mold; the operative parts of the device being in the positions they occupy before the valve stem is pulled into the stem opening of the mold and before pressure fluid is introduced into the stem to inflate the inner tube or other rubber article to be cured.

Fig. 2 is a view similar to Fig. 1 but showing the operative parts of the device in the positions they occupy when the valve stem has been drawn completely into the stem opening of the curing mold and pressure fluid can be introduced into the article to be cured.

Fig. 3 is an end elevational view of the device shown in Figs. 1 and 2 and is taken from the left hand end of Fig. 1, the operating handle being indicated by full lines in the position it occupies when the parts are as shown in Fig. 1 and in dotted lines in the position the operating handle occupies when the parts are in the relationship shown in Fig. 2.

Fig. 4 is a view partly in section and partly in elevation and is taken on the line 4—4 of Fig. 2 looking in the direction of the arrows.

Fig. 5 is a sectional view taken substantially on line 5—5 of Fig. 2 looking in the direction of the arrows.

Fig. 6 is a view similar to Fig. 2 with the valve stem omitted and showing the device equipped with steam chambers for applying additional heat to the valve stem, and Fig. 7 is an end elevational view of the device shown in Fig. 6 and is taken from the left hand end thereof.

The curing mold has only been shown fragmentarily in Figs. 1, 2 and 6, since the construction of the curing mold per se forms no part of the present invention and is well known and understood in the art. It should suffice herein to point out that preferably the curing mold is of the well-known watchcase type of mold and comprises the two relatively movable mold members 10 and 11, each of which is provided with an annular mold cavity of substantially semi-circular cross-section. The mold member 11 preferably is fixed while the mold member 10 is pivotally supported so as to allow it to be swung away from the mold member 11 or to be moved into closed position against the upper surface of the mold member 11, as indicated in Figs. 1, 2 and 6 of the drawings.

When the mold members are in open position an inflatable article to be cured can be positioned in the mold cavity of the member 11 as, for example, the uncured tire tube 12 shown in the drawings. When the inflatable article has been thus positioned the mold member 10 is moved into closed position as shown and the inflatable article is inflated to fill the circular and annular mold cavity formed by the cooperating mold cavities of the two members. Suitable pressure fluid is employed for inflating the inflatable article in the mold cavity, as will be well understood in the art.

It is usual in curing molds of this type to supply the heat of vulcanization by circulating steam through passages 13 cored out of the mold members 10 and 11 and located in relatively close proximity to the mold cavities therein. In the curing of the tire tubes it is usual to inflate the tubes in the curing mold by pressure fluid forced into the tubes through the valve stems thereof. These valve stems for the inner tubes are at the present time quite generally of the so-called rubber valve stem type. These rubber valve stems usually comprise a base portion which is secured to the outer surface of the tube and a stem portion extending outwardly from the base portion and ordinarily provided with a metal insert for receiving a valve insides, core or valve mechanism. These rubber valve stems are well known in the art and need not be described in greater detail herein.

It has been customary in manufacturing the rubber valve stems to mold the same and to cure or at least partially cure the valve stems before the latter are mounted on the inner tubes. It has been proposed also to finally mold and completely cure the rubber valve stems from uncured rubber stock simultaneously with the curing of the inner tubes in the curing mold. This latter method is fully disclosed in the aforementioned Bronson Patent No. 2,230,879.

Inasmuch as the connecting device embodying the present invention has particular utility when used in a curing mold for carrying out the method disclosed in said Bronson patent, it will be described herein in connection with such use, but it should be understood that said device may also be advantageously employed in molds for curing tire tubes equipped with rubber valve stems manufactured in a different manner from that disclosed in the said Bronson patent, such, for example, in the usual way in which rubber valve stems now are manufactured.

The connecting device embodying the present invention is so constructed that it can readily be employed with the conventional curing mold without the necessity of materially changing the mold construction and without altering any of the interior surfaces of the mold members which surfaces constitute the mold cavity.

The device embodying the present invention is rigidly but detachably associated with the lower mold member 11 and is mounted substantially entirely by the valve stem opening in said mold member.

The lower and stationary mold member 11 is provided with a valve stem opening 14 and, as stated, the device of the present invention is substantially entirely supported by this opening. A sleeve-like member 15 is mounted in the opening 14 of the lower mold member and has its outer end projecting outwardly of said mold member. The only change in the mold member which may be necessary to accommodate the sleeve-like member 15 may be slightly enlarging the diameter of the opening 14.

The sleeve-like member 15 has its inner end terminating adjacent the surface of the mold cavity and it is provided with a valve stem cavity 16 shaped to receive the rubber valve stem, as will later be pointed out. The outer end of the valve stem cavity 16 communicates with a reduced cylindrical bore extending to the outer end of the sleeve-like member 15 and of a diameter substantially corresponding to the external diameter of the extended outer end of the metal insert of the valve stem as will later become apparent.

The outer end of the member 15 is in the form of an externally threaded reduced nipple 17 which screws into the inner internally threaded end of an elongated sleeve 18 having an external diameter corresponding to the external diameter of the major portion of the member 15.

The sleeve 18 is externally threaded at its outer end, as indicated at 19, and inwardly of its outer end it is provided with an opening 20. Intermediate the opening 20 and the inner end of the sleeve which screws on the nipple 17 the interior of the sleeve is provided with square threads 21. A stem connecting member has a cylindrical portion 22 rotatable and endwise movable in the reduced cylindrical bore of the member 15. Extending inwardly from the cylindrical portion 22 the stem connecting member has a reduced portion projecting into the valve stem cavity 16 in the position of the parts as shown in Fig. 1. This reduced portion of the stem connecting member is externally threaded at 23 to screw into the internal threads of the metal insert 24 of the rubber valve stem 25. The reduced portion of the stem connecting member also at its inner end is tapered as indicated at 26 and is of such size that it will sealingly engage with the tapered portion 27 of the bore through the insert 24. The stem connecting member outwardly of the cylindrical portion 22 is reduced and has pinned or fixedly connected thereto a square threaded member 28 engaging the threads 21 of the elongated sleeve 18. Outwardly of the member 28 the reduced outer portion of the stem connecting member fits into a counterbore formed in an elongated gear 29 and said gear is pinned or otherwise fixedly connected to the connecting member to rotate therewith. The stem connecting member and the gear 29 are provided with a centrally disposed bore 30 therethrough which communicates at its upper end with a conical counterbore 31 formed in the outer end of the gear 29 for a purpose later to be explained.

In the form shown in Figs. 1 to 5 inclusive the fixed mold member 11 is provided with a plurality of recesses arranged concentrically to the valve stem opening in the mold member and to the member 15 located in said opening. Electrical heating units 32 are removably mounted in these recesses and said units are connected to a suitable source of electrical energy by the leads 33. The outer ends of the units 32 are located in circumferentially spaced openings formed in a ring 34 while the large central opening of the ring interfits the member 15 and the inner end of the elongated sleeve 18. Outwardly of the ring 34 a spacer sleeve 35 surrounds the elongated sleeve 18 and has its inner end abutting the outer end of the ring 34, as clearly shown in Figs. 1 and 2. The outer end of the sleeve 35 contacts a supporting disk 36 which interfits the elongated sleeve 18 and is locked thereto by one or more set screws 17, see Fig. 2.

The supporting disk 36 is provided with a bearing opening into which rotatably extends the integral sleeve portion of a gear 38. This gear is of such diameter that it projects through the opening 20 in the elongated sleeve 18 and meshes with the elongated gear 29. The gear 38 also extends slightly beyond the circumference of the disk 36 which has its upstanding flange 39 cut away at this point to accommodate the gear. The sleeve-like portion of the gear 38 surrounds a reduced portion of a shaft 40 and is pinned or otherwise fixedly connected to said reduced portion so that the gear 38 and shaft 40 rotate as a unit and relative to the disk 36. The outer end of the shaft 40 is reduced and rotatably interfits a bearing opening formed in a plate 41 which has a central opening therein through which extends the outer end of the elongated sleeve 18. The shaft 40 intermediate the plate 41 and the gear 38 has formed integrally therewith a gear 42.

An internal ring gear 43 is supported by the disk 36 within the flange 39 thereof and bears against the outer end surface of the gear 38. The internal ring gear 43 meshes with the gear 42 on the shaft 40. A ring 44 engages the outer surface of the internal ring gear 43 and is secured thereto by a plurality of suitable means such as the rivets 45, wherefore the ring 44 and the ring gear 43 can be rocked as a unit on the disk 36 and the outer end surface of the gear 38 between the same and the inner surface of the plate 41. The ring 44 has an integral radially extending arm 46 which projects beyond the periphery of the disk 36 and through a cut-away portion of the flange 39 of the disk and which portion is of predetermined arcuate extent and serves to limit the movement of the arm and the rocking of the ring and ring gear. The radially extending arm 46 has secured thereto a handle 47 by means of which the ring 44 and ring gear 43 can be rocked relative to the disk 36 and the plate 41. A cup-shaped member 48 having a threaded centrally disposed opening in its bottom wall is screwed onto the externally threaded outer end 19 of the elongated sleeve 18 and bears against the plate 41. The outer end of the member 48 is internally threaded to permit an externally threaded closure member 49 to be screwed into the member 48 to close the outer open end thereof. The closure member 49 has secured to its inner side an expansible bellows 50 which, in turn, has its inner end secured to a flat disk-like portion 51 integrally formed at the outer end of a cylindrical block 52 that is slidable in the bore of the outer end of the elongated sleeve 18. The block 52 on its inner end is provided with a centrally disposed conical projection 53 which sealingly interfits the conical counterbore 31 at the outer end of the gear 29. The block 52 has a bore 54 extending therethrough and which bore when the conical projection 53 is engaged in the conical counterbore 31 of the gear 29 is in communication with the bore 30 through the stem connecting member and the gear 29 as clearly shown in Fig. 2.

The closure member 49 on its outer side is provided with an externally threaded reduced nipple 55 to which can be connected a hose line extending from a source of supply of pressure fluid. The member 49 is provided with a bore 56 therethrough which communicates with the interior of the bellows 50 and thence with the bore 54 through the block 52.

The operation of the connecting device, the construction of which has been explained in detail, will now be described, and for the purpose of such description it will be assumed that the rubber valve stem 25 is to be finally molded or shaped and cured simultaneously with the curing of the inner tube 12. The inner tube 12, with the base of the uncured rubber stem 25 attached to the outer side of the tube, is mounted in the curing mold when the members 10 and 11 are in their open relationship. At this time the parts of the connecting device are in the position shown in Fig. 1 while the handle 47 is in the full line position of Fig. 3. The operator inserts the valve stem 25 into the valve stem opening in the mold member 11 and into the valve stem cavity 16 of the member 15 until the inner end of the stem connecting member is located in the interior of the insert 24 of the valve stem. At this time no pressure fluid is passing into the bellows 50, the introduction of pressure fluid into the bellows from the supply source being controlled by means not shown. The operator moves the handle 47 from the full line position of Fig. 3 to the dash line position thereof with a resultant rocking of the ring 44 and internal ring gear 43. The rocking of the ring gear 43 rotates the gear 42 and the shaft 40 to which is fixed the gear 38. This results in rotating the gear 38 which imparts accelerated rotation to the elongated gear 29 with which it is in mesh. Since the gear 29 is pinned to the stem connecting member the latter rotates with it thus causing the external threads 23 of the reduced inner end of the stem connecting member to screw into the internal threads of the insert 24 of the valve stem. At the same time the square threaded member 28 which is pinned to the stem connecting member rotates with the latter, and since the threaded member meshes with the square threads 21 in the interior of the elongated sleeve, the member, the connecting member and the elongated gear 29 move endwise as a unit in an outward direction while still rotating, thus drawing the valve stem completely into the stem cavity 16 and screwing the stem connecting member into the insert and until the external flange on the insert 24 contacts the shoulder at the outer end of the cavity 16, while the tapered inner end 26 of the connecting member sealingly engages the tapered bore portion 27 of the insert; that is, the valve stem moves from the position shown in Fig. 1 to the position shown in Fig. 2. When the valve stem connecting member and the elongated gear have thus been moved outwardly, the conical counterbore 31 is in interfitting relationship with the conical projection 53 of the plug 52.

It being assumed that the mold members are closed it will be understood that pressure fluid can be introduced through the bore 56 in the closure member, the bellows 50, the bore 54 in the plug 52 and the bore 30 in the gear 29 and the stem connecting member into the valve stem and thence into the inner tube to inflate the latter for the curing operation. The vulcanizing heat for curing the inner tube is supplied by circulating steam through the cored out chambers 13 in the mold member, while the electrical heating units 32 are energized to supply additional heat in close proximity to the valve stem, to the end that the latter will be properly and completely cured simultaneously with the curing of the inner tube and will have been molded into final shape in the valve stem cavity 16.

It will be understood that after the tube and stem have been cured the operator moves the handle 47 from the dash line position of Fig. 3 to the full line position thereof to cause the parts of the connecting device to change from the relationship shown in Fig. 2 to the relationship shown in Fig. 1, it being appreciated that such movement of the handle operates through the gearing previously referred to to rotate the stem connecting member and the threaded member 28 in the reverse direction and to effect endwise movement of the connecting member and the threaded member in an inward direction. The reverse rotation of the stem connecting member causes the threads 23 to unscrew with respect to the internal threads of the insert 24 of the valve stem.

In Figs. 6 and 7 there is shown a connecting device substantially the same as that previously illustrated and described and insofar as the elements of the connecting device shown in Figs. 6 and 7 are identical with the previously described form the same reference characters are employed to indicate the corresponding parts. The connecting device shown in Figs. 6 and 7 differs from the previously described device in that the fixed mold member 11 is provided with a recess surrounding the valve stem opening in the mold member but not extending completely through said member. A supporting block 57 is mounted in this recess and is interlocked with the member 15 and the elongated sleeve 18 by set screws 58 and 59. The member 15 also extends into the customary valve stem opening in the mold member 11 and is partially supported by said opening, it being noted that the surface of the member 11 which defines the mold cavity is not formed by any part of the connecting device. The supporting block 57 is provided with a cored out chamber 60 partially surrounding the member 15 and the inner end of the elongated sleeve. The cored out chamber 60 communicates with a plurality of bores 61 formed in a closure member 62 mounted on the outer end of the supporting block 57. The closure member 62 is provided with passages 63 communicating with the bores 61 and shaped and threaded at their outer ends as indicated at 64 to receive connecting fittings on pipes or conduits extending to a source of supply of steam, wherefore steam may be introduced into the chamber 60 to provide the vulcanizing heat for curing the valve stem.

Although several embodiments of the invention have been illustrated and described, it will be understood that the invention is susceptible of such variations and modifications as come within the scope of the appended claims.

Having thus described my invention, I claim:

1. In combination with a curing mold for inner tubes or other inflatable rubber articles and having a mold cavity therein, a device secured to said mold for connecting the valve stems of said articles to a source of pressure fluid and for positioning the stems during the curing of the articles, said device comprising tubular means provided with a threaded internal portion and with a valve stem cavity in communication with the mold cavity, a stem connecting member having a bore therethrough and slidable and rotatable in said means and provided with a threaded member cooperating with said threaded internal portion, said stem connecting member being provided at its inner end within said valve stem cavity with a threaded portion for screwing into a valve stem and with a portion for sealingly engaging the bore in said stem, and means for rotating said connecting member to cause said threaded portion thereof to screw into the valve stem and to cause said threaded member to move said connecting member endwise and including operating means having a limited rocking movement, and elements operatively connecting said operating means and said stem connecting member to trasmit the rocking movement of said operating means to said connecting member in the form of accelerated rotation of the latter.

2. In combination with a curing mold for inner tubes or other inflatable rubber articles and which mold is provided with a mold cavity formed entirely by the mold and also with an opening for the valve stems of said articles in communication with said mold cavity, a device secured to said mold and comprising tubular means interfitting said valve stem opening in the mold and fixedly secured in said opening and provided with a valve stem cavity in communication with the mold cavity and shaped to receive and mold therein the rubber valve stems of the articles being cured in the mold, a movable member operatively associated with said tubular means and extending into said stem cavity and provided with a passage therein and means for connecting the member to the valve stems with said passage in communication with the latter, means operatively associated with said tubular means and said member for connecting the passage in the latter to a source of pressure fluid, and actuating means operatively associated with said tubular means and said member for moving the latter to connect it to the valve stems and to draw said stems into the stem cavity.

3. In combination with a curing fold for inner tubes or other inflatable rubber articles and having a mold cavity, a device for connecting the valve stems of said articles to a source of pressure fluid and for positioning the stems during the curing of the articles, said device comprising fixed elements secured to the mold and provided with an internally threaded portion and with a valve stem cavity in communication with the mold cavity, a member rotatably and slidably supported in said elements and extending into said valve stem cavity and having a passage therethrough and provided with means for connecting the inner end of said member with the valve stems with the passage in communication with the latter, said member also being provided with threaded means cooperating with the internally threaded portion of said elements whereby rotation of said member causes the same to move endwise in said elements, means operatively associated with said member and said elements for rotating said member and means for connecting the passage in said member with a source of pressure fluid.

4. The combination defined in claim 3 and wherein the means for connecting the passage in said member with a source of pressure fluid includes a slidable block operatively connected with a bellows.

5. In combination with a curing mold for inner tubes or other inflatable rubber articles and which mold is provided with a mold cavity formed entirely by the mold and with an opening for the valve stems of said tubes or articles and with a recess adjacent said opening and extending from the exterior of the mold partially through the same toward the mold cavity, tubular means interfitting said valve stem opening in the mold and secured in said opening and provided with a valve stem cavity in communication with the mold cavity, a movable member mounted in said means and extending into said stem cavity and provided with a passage therethrough and with means at its inner end for connecting the member to the valve stems with said passage in communication with the latter, means operatively associated with said tubular means and said member for moving the latter to connect it to the valve stems and to draw the stems into the stem cavity, means for connecting the passage in said member to a source of pressure fluid, and means mounted in said recess in said mold for applying heat to said mold in close proximity to said tubular means.

6. In combination with a curing mold for inner tubes or other inflatable rubber articles and which mold is provided with a mold cavity formed solely by the mold and with an opening for the valve stems of said tubes or articles communicating with said mold cavity and with a plurality of spaced recesses surrounding said opening and extending from exteriorly of the mold partially through the same toward said mold cavity, tubular means interfitting said opening and secured therein and provided with a valve stem cavity in communication with the mold cavity, a movable member mounted in said tubular means and extending into said stem cavity and provided with a passage therethrough and with means at its inner end for connecting it to the valve stems with said passage in communication with the latter, means operatively associated with said tubular means and said member for moving the latter to connect it to the valve stems and to draw the stems into the stem cavity, means operatively associated with said member for connecting the passage therein with a source of pressure fluid, and electrical heating units mounted in said recesses for supplying heat in close proximity to said tubular means.

7. In combination with a curing mold for inner tubes or other inflatable rubber articles and which mold is provided with a mold cavity the surface of which is formed entirely by the mold and with an opening extending laterally from the mold cavity for the valve stems of the tubes or articles, said mold also being provided with a recess adjacent said opening and extending from exteriorly of the mold toward said mold cavity, tubular means interfitting said opening and extending to the inner end thereof and secured therein and provided with a valve stem cavity in communication with said mold cavity, a movable member mounted in said tubular means and extending into said valve stem cavity and provided with a passage therein and with means for connecting the member to the valve stems with said passage in communication with the latter, means operatively associated with said tubular means and said member for moving the latter to connect it to the valve stems and to draw the stems into the stem cavity, means operatively associated with said member for connecting the passage therein with a source of pressure fluid, and a block secured in said recess and surrounding a portion of said tubular means and provided with a cored out chamber and means of introducing a heating medium into said chamber.

8. A device adapted to be secured to a curing mold for inner tubes or other inflatable rubber articles for connecting the valve stems of said articles to a source of pressure fluid and for positioning the stems during the curing of the articles and comprising fixed elements adapted to be secured to the mold and provided with an internally threaded portion and with a valve stem cavity adapted when said elements are so secured to the mold to be in communication with the mold cavity, a member rotatably and slidably supported in said elements and extending into said valve stem cavity and having a passage therethrough and provided with means for connecting the inner end of said member with the valve stems with the passage in communication with the latter, said member also being provided with threaded means cooperating with the internally threaded portion of said elements whereby rotation of said member causes the same to move endwise in said elements, means operatively associated with said member and said elements for rotating said member, and means for connecting the passage in said member with a source of pressure fluid.

9. A device adapted to be secured to a curing mold for inner tubes or other inflatable rubber articles for connecting the valve stems of said articles to a source of pressure fluid and for positioning the stems during the curing of the articles in the mold and comprising tubular means provided with a threaded internal portion and with a valve stem cavity adapted when said device is secured to the mold to be in communication with the mold cavity, a stem connecting member having a bore therethrough and slidable and rotatable in said means and provided with a threaded member cooperating with said threaded internal portion, said stem connecting member being provided at its inner end within said valve stem cavity with a threaded portion adapted to screw into a valve stem and with a portion adapted to have sealing engagement with the bore of said stem, and means for rotating said connecting member to cause said threaded portion thereof to screw into the valve stem and to cause said threaded member to move said connecting member endwise and including operating means having a limited rocking movement, and elements operatively connecting said operating means and said stem connecting member to transmit the rocking movement of said operating means to said connecting member in the form of accelerated rotation of the latter.

JOHN C. CROWLEY.